F. W. LYNCH.
ATTACHMENT FOR INTERNAL COMBUSTION ENGINES.
APPLICATION FILED AUG. 16, 1917.
1,289,841.
Patented Dec. 31, 1918.
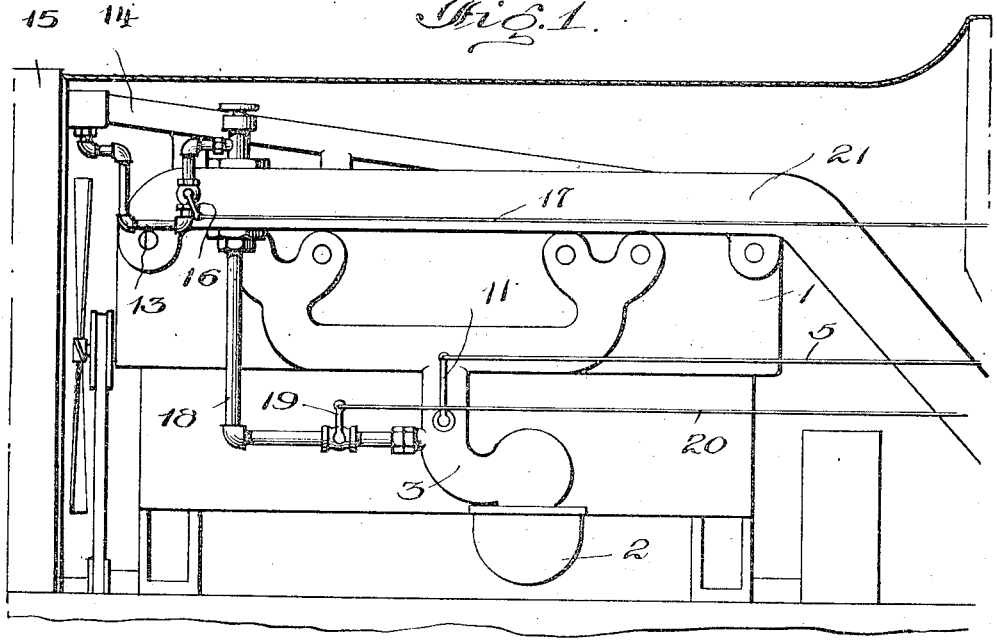
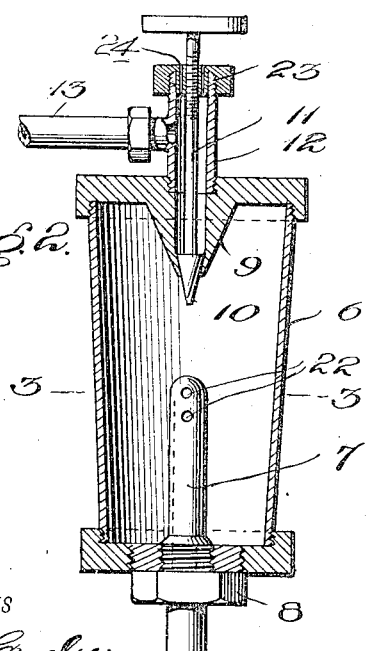
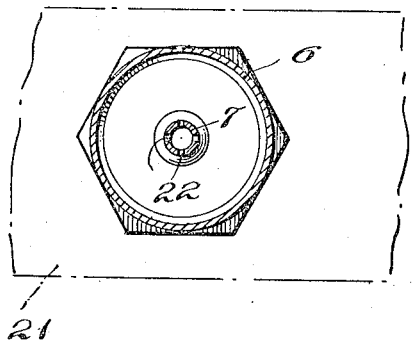
WITNESSES
INVENTOR
Floyd W. Lynch
BY
ATTORNEYS

UNITED STATES PATENT OFFICE.

FLOYD WOOLFORD LYNCH, OF HOUSTON, TEXAS.

ATTACHMENT FOR INTERNAL-COMBUSTION ENGINES.

1,289,841.      Specification of Letters Patent.      Patented Dec. 31, 1918.

Application filed August 16, 1917. Serial No. 186,646.

*To all whom it may concern:*

Be it known that I, FLOYD WOOLFORD LYNCH, a citizen of the United States, and a resident of Houston, in the county of Harris and State of Texas, have invented new and useful Improvements in Attachments for Internal-Combustion Engines, of which the following is a specification.

My invention is an improvement in attachments for internal combustion engines, and has for its object to provide an attachment of the character specified, adapted for connection with internal combustion engines of every character, for heating and vaporizing fuel, as, for instance, gasolene and kerosene and the like, and for vaporizing water to supply a mixture of air and steam to the fuel mixture.

In the drawings:
Figure 1 is a section through the hood of an automobile showing the attachment in connection with the engine;

Fig. 2 is a vertical section through the attachment;
Fig. 3 is a section on the line 3—3 of Fig. 2.

The present embodiment of the invention is shown in connection with an engine 1, whose cylinders are supplied with fuel from the usual carbureter 2 which connects with the cylinders by the manifold 3. The usual throttle valve, indicated at 11, is arranged between the carbureter and the engine, and a link 5 leads to the dashboard for controlling the throttle.

The attachment consists of a casing 6 composed of a tapering body having its ends closed by heads which are threaded on to the body, as shown in Fig. 2. A nozzle 7 extends through the lower head, the said nozzle being threaded into a nut 8 which, in turn, is threaded into an opening in the head. The upper head has a central depending tapering nipple 9, whose lower end is formed into a conical valve seat, with which coöperates a conical valve 10. This valve has connected therewith a stem 11 having a head at its outer end for manipulating the same, and the head has threaded engagement with a T 12 which is threaded into the head. The lateral branch of this T has connected therewith a pipe 13 which, at its other end, is connected with the return pipe 14 of the radiator 15 when it is desired to vaporize water, or with a fuel supply when it is desired to vaporize fuel.

A cut-off valve 16 is arranged in the pipe 13, and a link 17 leads from the said valve to the dashboard for operating the valve. The nozzle 7 is connected by a pipe 18 with the manifold 3 between the carbureter and the throttle valve 11, and a cut-out valve 19 is interposed in the pipe 18, the said valve being controlled by a link 20 leading to the dashboard. The casing 7 is arranged in the exhaust pipe 21 of the engine in such manner that the heated air will pass on both sides of the casing and will heat the same and the nozzle 7.
In operation, the valve 10 is set to permit the proper amount of water or fuel to drip upon the nozzle 7, and this water or fuel is vaporized, passing through radial openings 22 in the nozzle into the interior thereof and from there to the manifold. It will be noticed that the outer end of the T 12, which is closed by a packing 23, has openings 24 for permitting air to enter to mix with the steam, and this mixture of steam and air is supplied with the fuel when water is vaporized. When fuel is vaporized the air is mixed directly with the fuel.

I claim:

1. A device of the character specified, comprising a casing adapted to be arranged within the exhaust pipe of a motor vehicle, a nozzle extending through the lower end of the casing and provided with openings spaced above the bottom of the casing, a valve seat at the upper end, a valve coöperating with the seat, means in connection with the valve for holding it in adjusted position, said upper end of the casing being adapted for connection with a source of water or fuel supply and the lower end with the manifold of an engine between the throttle valve and the carbureter, said casing having openings at the top for permitting the entrance of air, and cut-off valves between the source of water or fuel supply and between the valve and the manifold.

2. A device of the character specified, comprising a casing having a nozzle extending upwardly through the lower end thereof and provided with openings spaced above the bottom of the casing, said casing being adapted to be arranged within the exhaust pipe of a motor vehicle to heat the same, and means for dripping a liquid upon the nozzle to vaporize the same. the said means having means in connection therewith for permitting the entrance of air to mix with the vaporized liquid.

FLOYD WOOLFORD LYNCH.

Copies of this patent may be obtained for five cents each, by addressing the "Commissioner of Patents, Washington, D. C."